United States Patent [19]
Brown et al.

[11] Patent Number: 5,559,897
[45] Date of Patent: Sep. 24, 1996

[54] METHODS AND SYSTEMS FOR PERFORMING HANDWRITING RECOGNITION FROM RAW GRAPHICAL IMAGE DATA

[75] Inventors: Michael K. Brown, North Plainfield; Stephen C. Glinski, Edison; Jianying Hu, Hoboken; William Turin, East Brunswick, all of N.J.

[73] Assignee: Lucent Technologies Inc., Murray Hill, N.J.

[21] Appl. No.: 290,623

[22] Filed: Aug. 15, 1994

Related U.S. Application Data

[63] Continuation-in-part of Ser. No. 184,811, Jan. 21, 1994.

[51] Int. Cl.$^6$ .................................................. G06K 9/00
[52] U.S. Cl. .......................... 382/186; 382/119; 382/187
[58] Field of Search .................................. 382/186, 187, 382/119, 161, 229

[56] References Cited

U.S. PATENT DOCUMENTS

| | | | |
|---|---|---|---|
| 5,131,054 | 7/1992 | Smith | 382/161 |
| 5,295,197 | 3/1994 | Takenaga et al. | 382/161 |
| 5,313,527 | 5/1994 | Guberman et al. | 382/186 |
| 5,319,721 | 6/1994 | Chefalas et al. | 382/161 |
| 5,377,281 | 12/1994 | Ballard et al. | 382/229 |

OTHER PUBLICATIONS

Brown, M. K., Ganapathy, S., "Preprocessing Techniques for Cursive Script Recognition," Pattern Recognition, vol. 16, No. 5, pp. 447–458, Nov. 1983. Printed in Great Britain Pergamon Press Ltd. Pattern Recognition Society.

Craven, P., Wahba, W., "Smoothing Noisy Data with Spline Functions: Estimating the Correct Degree of Smoothing by the Method of Generalized Cross–Validation," Numerische Mathematic, vol. 31, pp. 377–403, 1979.

Lowerre, B. T., Reddy, R., "The Harpy Speech Understanding System," Trends in Speech Recognition, Chap. 15, pp. 340–360, 1980. No Publication Place.

Lyche, T., Schumaker, L. L., "Computation of Smoothing and Interpolating Natural Splines via Local Buses," Siam J. Numer Anal., vol. 10, No. 6, pp. 1027–1038, 1973. No Publication Place. Siam J. Numer. Anal., Dec. 1973.

*Primary Examiner*—Leo Boudreau
*Assistant Examiner*—Bijan Tadayon

[57] ABSTRACT

Methods and systems for performing handwriting recognition which include, in part, application of stochastic modeling techniques in conjunction with language modeling. Handwriting recognition is performed on a received data set, which is representative of a handwriting sample comprised of one or more symbols. Recognition is performed by representing the data set as a sequence of features and then processing the features utilizing stochastic modeling in conjunction with an evolutional grammer for performing stroke identification, to identify the handwriting sample.

11 Claims, 4 Drawing Sheets

METHODS AND SYSTEMS FOR PERFORMING HANDWRITING RECOGNITION FROM RAW GRAPHICAL IMAGE DATA

CROSS REFERENCE TO RELATED APPLICATION

This is a continuation in part of U.S. patent application Ser. No. 08/184811, filed Jan. 21, 1994, entitled "Large Vocabulary Connected Speech Recognition System and Method of Language Representation Using Evolutional Grammar to Represent Context Free Grammars," copending and commonly assigned with the present invention, the disclosure of which is incorporated herein by reference.

TECHNICAL FIELD OF THE INVENTION

The present invention relates in general to electronic image analysis, and in particular to methods and systems for performing writer independent handwriting recognition.

BACKGROUND OF THE INVENTION

In processing systems, including both data processing and communications systems, it is desirable to provide user interfaces which are convenient, efficient, accurate and cost effective. With the introduction of pen-based laptop computing, and its growing popularity, computer recognition of handwriting, both cursive and printed, is of increasing importance. Until recently, processing system recognition of handwritten data received relatively little attention in comparison to optical character recognition, speech recognition, and other image or scene analysis.

In the late 1960's there was a fair amount of interest in cursive script and print recognition, but this activity waned in the 1970's and early 1980's. Interest increased significantly from the mid- 1980's through the present with the introduction of small, but sufficiently powerful, portable computers. Development of pen-based computing quickly followed, resulting in several commercial products which experienced limited success. The limited success was due largely to a lack of speed and accuracy in recognizing and authenticating cursive and print handwriting, precluding these products from being sufficiently useful for many applications. Many early handwriting recognition systems produced dismally poor results, some studies reporting as low as 30% recognition accuracy of handwritten letter data. Worse, research efforts, which often utilized select training data, produced only marginal improvements over the aforementioned results. Recognition accuracy remains the dominant obstacle to producing commercially successful products.

SUMMARY OF THE INVENTION

The problems of the prior art handwriting recognition approaches are overcome in accordance with the principles of the present invention which utilize, in part, sophisticated stochastic modeling techniques in conjunction with language modeling to perform writer independent handwriting recognition. Writer independent handwriting recognition includes cursive script, broken cursive script, and printed symbols.

A first method of operation for performing handwriting recognition involves segmenting a received data set representative of a handwriting sample into one or more data subsets utilizing a stochastic recognition algorithm to identify each of the data subsets among one or more alternatives, wherein each of the data subsets represents a segment of the handwriting sample, and evaluating the identified data subsets as a segment sequence to recognize the handwriting sample.

A second method of operation for performing handwriting recognition includes receiving input data signals representative of a handwriting sample including at least one symbol, processing the input data signal utilizing stochastic modeling in conjunction with an evolutional grammar to identify subsets of the input data signals from among a set of alternatives, each one of the subsets representative of a particular segment of the symbol, and evaluating the identified subsets as a segment sequence to recognize the symbol. A symbol shall be understood to refer to any character, letter, numeral, token, or other cognizable figure or representation.

A processing system according to the principles of the present invention for performing handwriting analysis includes at least one of each of the following, namely, an input port, a memory storage device and a processing unit, and, optionally, an output port. The input port is operable to receive a data set representative of a handwriting sample, the handwriting sample comprising one or more symbols. The memory storage device is operable to store a plurality of processing system instructions. The processing unit, which is for analyzing the data set, retrieves and executes at least one of the processing unit instructions from the memory storage device. The processing unit instruction directs the processing unit to selectively segment the data set into one or more data subsets utilizing a stochastic recognition algorithm to identify the data subsets from among one or more alternatives, wherein each data subset represents a stroke within the handwriting sample, and recognizes the handwriting sample by evaluating the identified data subsets as a stroke sequence. The optional output port is operable to transmit a data signal, which may include the aforementioned stroke sequence.

In the preferred embodiment of the invention, the evolutional grammar is represented by a grammar network. The grammar network includes a plurality of arcs interconnecting a plurality of nodes. Each of the arcs is representative of a respective recognition model, having a source node and a destination node, and in which handwriting feature scores are input to the grammar network and resulting cumulative hypothesis scores are propagated through the recognition model to produce cumulative hypothesis scores at various ones of the nodes.

The preferred embodiment of the invention further includes preprocessing techniques which reduce noise and normalization problems associated with the received data set. The preprocessing techniques include means for filtering and normalizing the received data set. Filtering, in part, involves the reduction of signal abnormalities inherent to the received data set. When filtering, it is preferred that the techniques utilized include identifying handwriting cusps within the data set and screening the extraneous noise from the data set preferably utilizing a curve approximating technique which treats each identified handwriting cusp as a boundary point. Normalizing, in part, may involve scaling to a standard size, rotation of the text baseline, deskewing slanted handwritten samples, etc.

One embodiment for using and/or distributing the present invention is as software stored in a conventional storage medium. The software includes a plurality of computer instructions for controlling one or more processing units for performing handwriting recognition and analysis in accordance with the principles of the present invention. The storage mediums utilized may include, but are not limited to, magnetic storage, optical memory and semiconductor chip.

The foregoing has outlined rather broadly the principles of the present invention, as well as a number of the present invention's features and advantages, in order that the detailed description of the invention that follows may be better understood.

BRIEF DESCRIPTION OF THE DRAWINGS

For a more complete understanding of the present invention, and the advantages thereof, reference is now made to the following descriptions taken in conjunction with the accompanying drawings, wherein like numbers designate like parts, and in which.

DETAILED DESCRIPTION OF THE INVENTION

Figure 1:
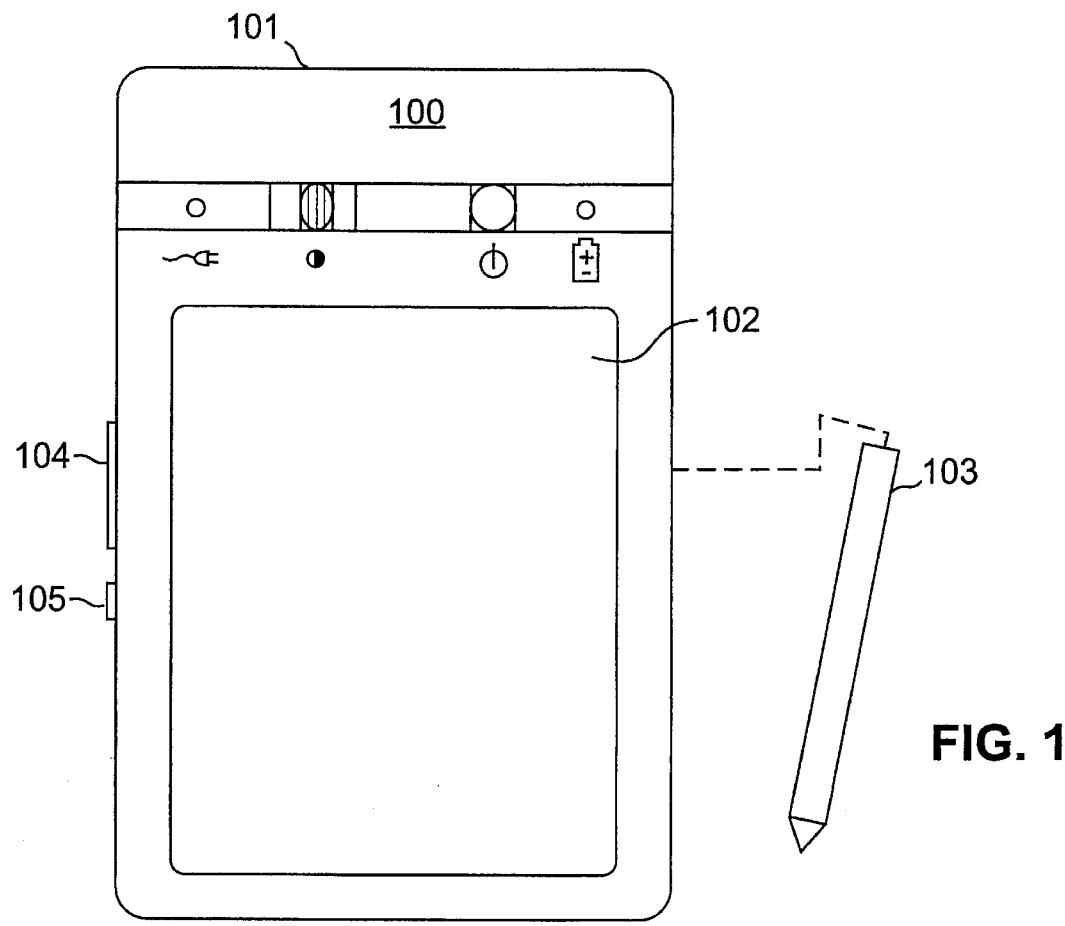
FIG. 1 illustrates an isometric view of a hand held processing system in accordance with the principles of the present invention.
Figure 2:
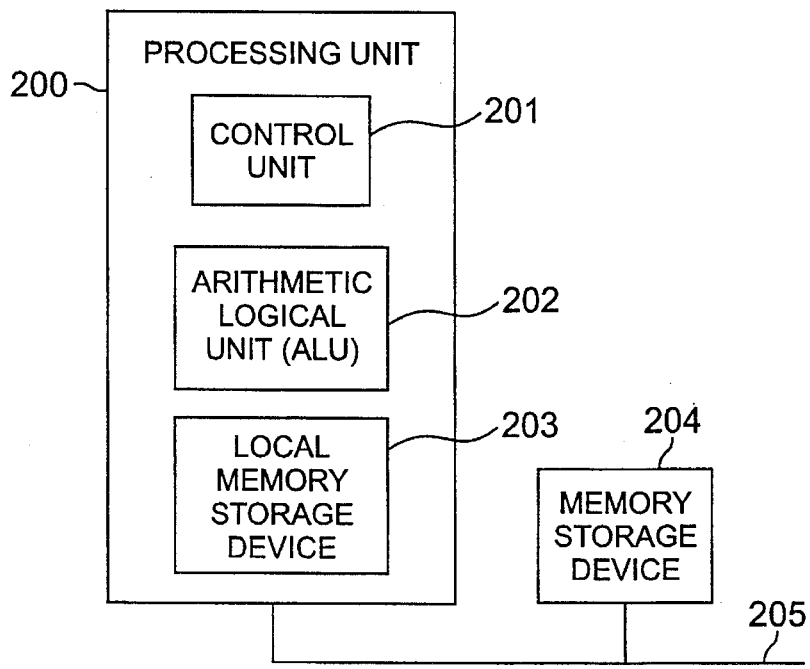
FIG. 2 illustrates a block diagram of a microprocessing system.
Figure 3:
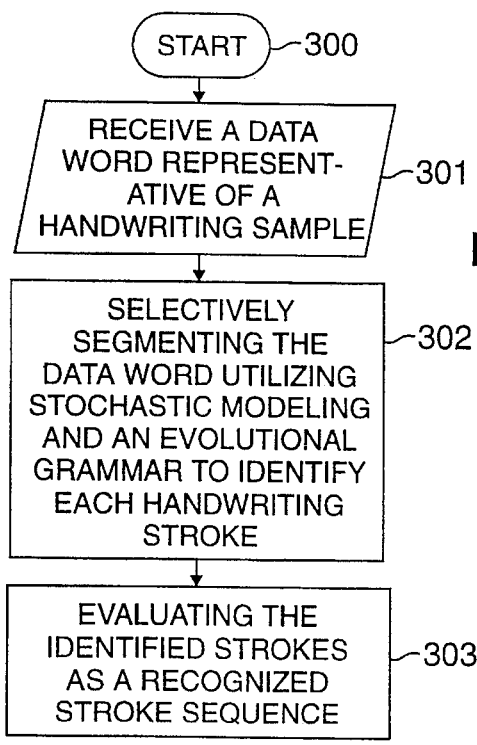
FIG. 3 illustrates a flow diagram of a method according to the principles of the present invention.
Figure 4:
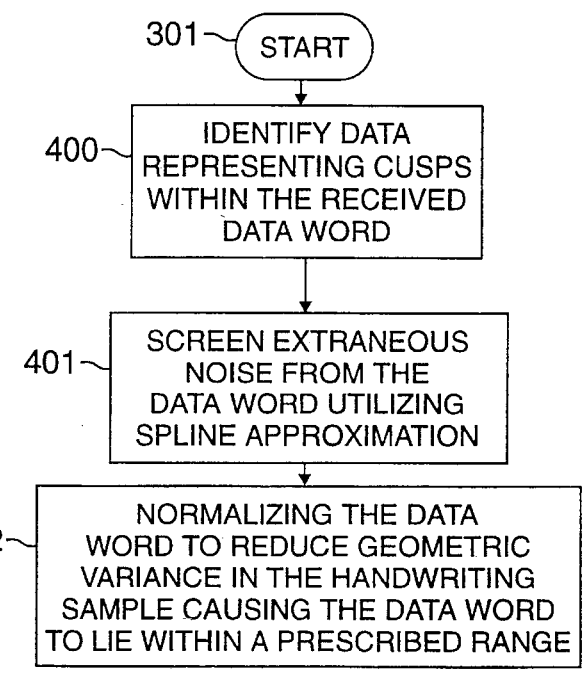
FIG. 4 illustrates a flow diagram of a method of preprocessing a received data set representative of a handwriting sample.
Figure 5:
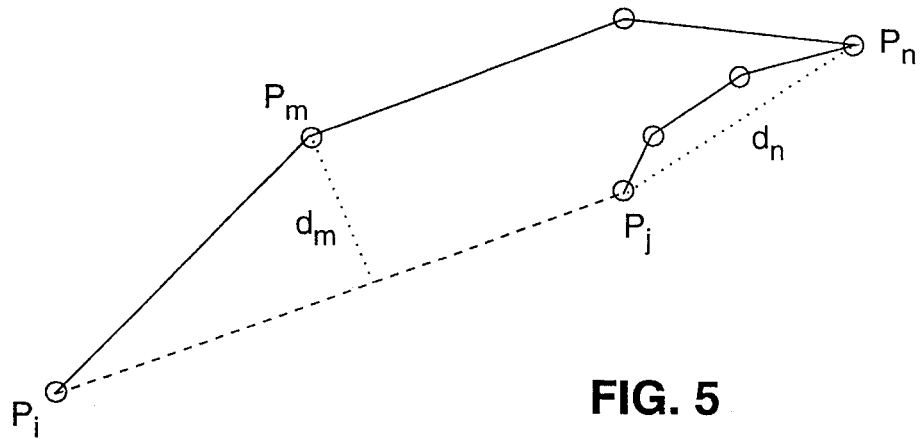
FIG. 5 illustrates a linear diagram of regional shape examinations in cusp detection.
Figure 6:
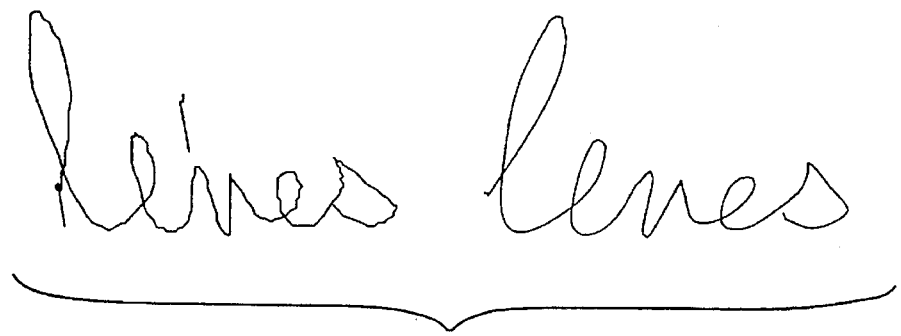
FIG. 6 illustrates a handwriting sample both before and after preprocessing.
Figure 8:
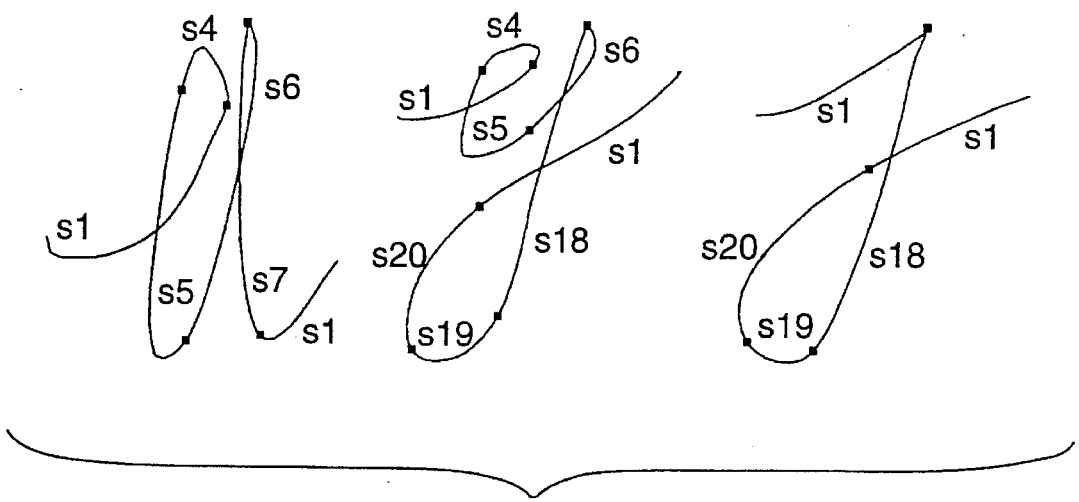
FIG. 8 illustrates the segmentation of several handwriting letter samples.
Figure 9:
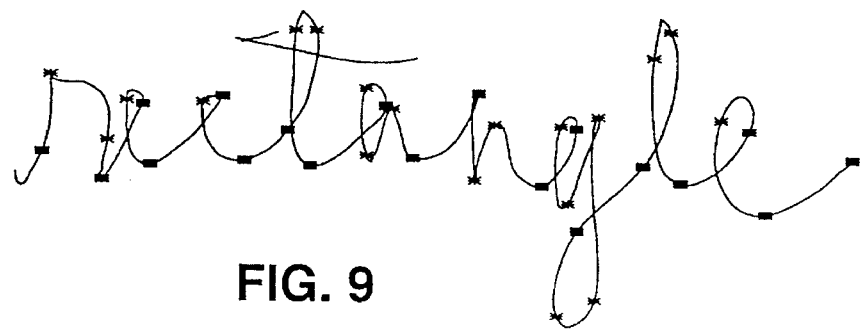
FIG. 9 illustrates the segmentation of the handwriting sample "rectangle".
Figure 7:
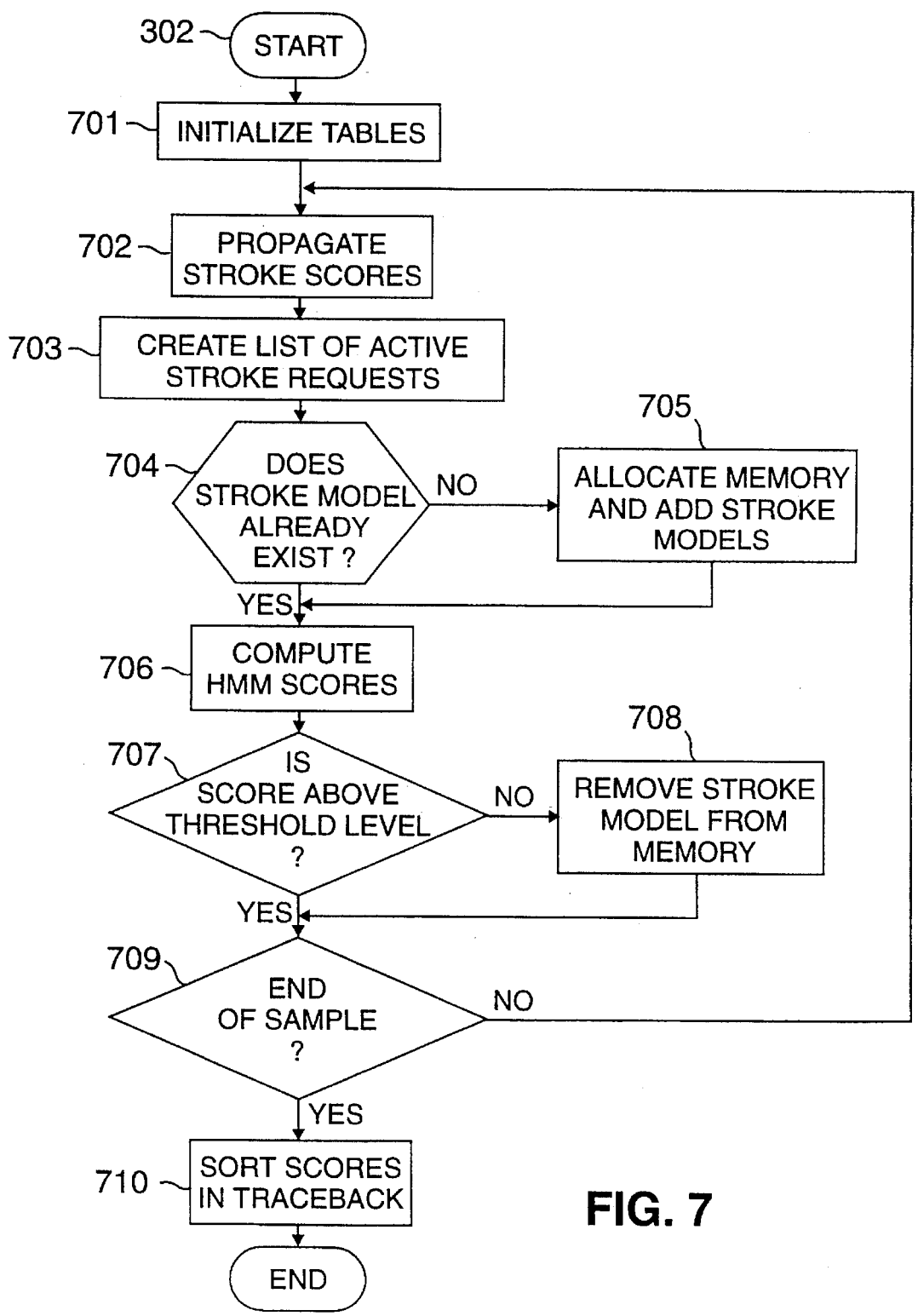
FIG. 7 illustrates a flow diagram of a method of identifying strokes utilizing an evolutional grammar.

The principles of the present invention and their advantages are best understood by referring to the illustrated embodiment depicted in FIGS. 1–9 of the drawings. FIGS. 1 and 2 illustrate a hand held microprocessing system which may be programmed in accordance with the principles of the present invention to perform recognition and analysis of writer independent handwritten data. FIG. 3 illustrates the preferred method of operation for performing handwriting recognition and analysis. In accordance with the preferred method of performing handwriting recognition and analysis, FIGS. 4 and 7 illustrate the preferred methods of operation for performing preprocessing of handwritten data and stroke identification utilizing an evolutional grammar, respectively. In accordance with the preferred method of preprocessing the handwritten data, FIGS. 5 and 6 illustrate diagrams in conjunction with discussion of the preferred methods of operation for detecting cusps within the handwritten data, and normalizing the handwritten data, respectively. Lastly, in accordance with the preferred method of stroke identification discussed in conjunction with FIG. 7, FIGS. 8 and 9 illustrate, with related discussion, the segmentation of several handwritten letter and word samples, respectively.

FIG. 1 illustrates an isometric view of a hand held processing system 100 in accordance with the principles of the present invention. Hand held processing system 100 includes a hardware casing 101, a display screen 102, a stylus 103, a disk drive 104 and an input port 105. Implemented within the hardware casing 101 is a microprocessing system (illustrated in FIG. 2) for processing received data in response to one or more instructions. The microprocessing system preferably includes at least one memory storage device and at least one processing unit. The memory storage device is operable to store one or more instructions which the processing unit is operable to retrieve and execute, enabling processing system 100 to perform handwriting recognition on a received data set representative of a handwritten sample. Although hand held processing system 100 has been utilized for illustrating the principles of the present invention, the present invention may alternately be implemented within any processing system, including, for example, sophisticated calculators and personal, mini, mainframe and super computers, including parallel processing architectures, and within networked combinations of the foregoing as well.

Processing system 100 is preferably operable to receive, interpret and respond to external stimuli, which may be interactively and dynamically received, from an external input device, such as stylus 103 used in conjunction with display screen 102, or alternatively, via a light pen, a mouse or other suitably arranged data input device. Data may further be received from an external storage disk (floppy disk, compact disc, or other suitably arranged data storage device) via disk drive 104, or as a received data stream, which may be dynamically received, through input port 105. Input port 105 may be a serial or parallel port. An important aspect of the invention therefore is that data collection and visualization need not occur coincidentally.

FIG. 2 illustrates a conceptual block diagram of one of a number of microprocessing systems which may be utilized in conjunction with FIG. 1. The illustrated microprocessing system includes a single processing unit 200 coupled with a single memory storage device 204 via a data bus 205. The processing unit 200 includes a control unit 201, an arithmetic logic unit ("ALU") 202, and a local memory storage device 203, such as, for example, stackable cache or a plurality of registers. Control unit 201 is operable to fetch instructions from memory storage device 204. ALU 202 is operable to perform a plurality of operations, including mathematical and logical operations needed to carry out instructions. Local memory storage device 203 is operable to provide high-speed storage used for storing temporary results and control information. The illustrated microprocessing system provides processing means for performing handwriting recognition. Accordingly, any processing system having at least one processing unit suitably arranged in accordance with the principles of the present invention may be utilized.

FIG. 3 illustrates a flow diagram of a method for recognizing handwritten data which is preferably carried out within processing system 100 of FIG. 1. Upon entering a START block 300, the processing system 100 receives, as an input, a data set representative of the handwriting sample, block 301. The handwriting sample preferably includes one or more symbols. In one embodiment of the invention, the received data set is preprocessed to reduce extraneous noise and geometric variance, the preferred preprocessing techniques being more fully discussed with reference to FIG. 4. Processing system 100 selectively segments the data set into at least one data subset utilizing a stochastic recognition algorithm, which preferably includes an evolutional grammar, to thereby identify the data subset among one or more alternatives, block 302. Evolutional grammars are more fully described in U.S. Ser. No. 08/184811. Each identified data subset is preferably representative of a handwriting stroke within the handwriting sample, wherein each symbol within the handwriting sample includes one or more strokes. Preferably, each handwriting sample is represented as a sequence of feature observations wherein each feature observation is composed of one or more features, preferably including a slope angle α of the tangent, resampled at points evenly distributed by arc length along the linearly interpolated handwriting sample, and approximated simply by the local slope angle. The preferred method of identifying strokes within the handwriting sample is discussed in detail with reference to FIG. 7. Processing system 100 then evaluates the identified data subsets as a recognized stroke sequence representative of one or more symbols to recognize the handwriting sample, block 303. In one embodiment, processing system 100 transmits the recognized stroke sequence via an output port, possibly to a display device, such as display screen 102 in FIG. 1, or, alternatively, to another suitably arranged output or indicating device.

FIG. 4 illustrates a flow diagram of a method of preprocessing the received data set of FIG. 3. Upon entering the START block 301, the processing system 100 filters the data set to remove extraneous noise, which typically is accomplished by frequency filtering the signal of the data set. Filtering is preferably performed upon the data set to identify cusps within the handwriting sample, block 400, and to screen extraneous noise from the data set utilizing a spline approximation, block 401. The spline approximation preferably treats each of the identified handwriting cusps as a boundary point within the handwriting sample. The preferred method of detecting cusps is discussed in detail with reference to FIG. 5. Spline approximation is more fully described in "Smoothing Noisy Data with Spline Functions: Estimating the Correct Degree of Smoothing by the Method of Generalized Cross-Validation," *Numerische Mathematic*, Vol. 31, pp. 377–403, 1979, by P. Craven and G. Wahba, and in "Computation of Smoothing and Interpolating Natural Splines via Local Buses," *SIAM J. Numer. Anal.*, vol. 10, no. 6, pp. 1027–1038, 1973, by T. Lyche and L. L. Schumaker, which are incorporated herein by reference. Lastly, processing system 100 normalizes the filtered data set to reduce the geometric variance in the handwriting sample thereby causing the data set to lie within a prescribed range, block 402. Examples of normalization techniques include scaling to a standard size, rotation of the text baseline, deskewing of slanted text, etc. The preferred method for deskewing slanted text is discussed in detail with reference to FIG. 6.

FIG. 5 illustrates a linear diagram of regional shape examinations in cusp detection. Generally, cusps are points where abrupt changes in stroke direction occur within the handwriting sample, and which are preferably treated as boundary points during spline approximation, to thereby avoid smoothing out important shape features. The most direct and efficient way to detect cusps is to examine the dot product of adjacent segments, which is more fully described in "Preprocessing Techniques for Cursive Script Recognition," *Pattern Recognition*, vol. 16, no. 5, pp. 447–458, November 1983, by M. K. Brown and S. Ganapathy, which is incorporated herein by reference. This method's results may be less accurate when the handwriting sample contains small zig-zags caused by the device quantization error or noise. Accordingly, it is preferable to utilize a cusp detection algorithm which performs well on unsmoothed data. The preferred algorithm is illustrated in TABLE 1, below.

TABLE 1

Cusp Detection Algorithm

Input:
    Sequence of data points $P_1, P_2, \ldots, P_n$.
    Threshold E.

Begin
    Set initial focus region $i=1$; $j=3$;
    Set initial set of cusp indices: $S_c = \emptyset$;
    while $j \leq n$ do {
        $d_{max}=0$;
        $d'_{max}=0$;
        for each point $P_k$ ($i<k<j$) do
            if $|P_iP_k|>|P_iP_j|$ or $|P_kP_j|>|P_iP_j|$ then {
                ($P_k$ is a potential cusp)
                $d_k=\min\{|P_iP_k|,|P_kP_j|\}$;
                if $d_k>d'_{max}$ then {
                    $d'_{max}=d_k$;
                    $k'_{max}=k$;
                }
            }
            else {
                ($P_k$ is not a potential cusp)
                $d_k$=distance from $P_k$ to line segment $P_iP_j$;
                if $d_k>d_{max}$ then {
                    $d_{max}=d_k$;
                    $k_{max}=k$;
                }
            }
        if $d'_{max}>E$ then {
            add $k'_{max}$ to set $S_c$;
            $i=k'_{max}$;
        }
        elseif $d_{max}>E$ then
            $i=k_{max}$;
        $j=j+1$;
    }
End.

The cusp detection algorithm operates on a focus region whose size and location change dynamically according to the results of regional shape examinations. For example, in FIG. 5, a focus region is illustrated wherein $P_n$ qualifies as a potential cusp, and in contrast $P_m$ does not. The cusp detection algorithm starts with the focus region containing the first three sample points of the input data, and finishes when the region containing the last point of the input data has been examined. By examining dynamically defined overlapping regions this algorithm captures the dominant cusps while ignoring small variations caused by noise or quantization error. Preferably, the value for the threshold E should be chosen according to the quality of the input device.

FIG. 6 illustrates a handwriting sample of the word "lines" before (on the left) and after (on the right) preprocessing. The deskewing of slanted text is preferably accomplished utilizing a skew angle estimation algorithm wherein the points of maximum and minimum y coordinates are identified, and downward strokes (strokes going from a maximum point to a minimum point and longer than a threshold) are isolated. The straight piece of each downward stroke is then obtained by truncating the stroke from both ends until the angles formed by the two halves of the stroke differ by less than 10 degrees. The estimated skew angle θ is the average of the skew angles of all the straight pieces, each weighted by the length of the piece. After the skew angle estimation, each point in the script is then corrected by replacing x by $x'=x-y\tan(\theta)$.

FIG. 7 illustrates a flow diagram of a preferred method of identifying strokes within the handwriting sample. As previously introduced, a stochastic recognition algorithm is preferably utilized to identify each stroke comprising the handwriting sample. Preferably, the stochastic recognition algorithm utilizes an evolutional grammar. An evolutional grammar refers to the process of growing a grammar representation while the language definition is not necessarily changing. The preferred grammar representation includes arcs interconnecting nodes wherein ones of the arcs are terminal arcs representing respective recognition models and others are non-terminal arcs representing respective grammar sub-networks. Each one of the arcs preferably has both a source node and a destination node, in which feature scores are input to the grammar network and resulting cumulative hypothesis scores are propagated through the recognition models to produce cumulative hypothesis scores at various nodes.

The three primary components of the preferred evolutional grammar are a grammar arc table, a null arc (unlabeled grammar arc) table, and a Recursive Transition Network ("RTN") grammatical rule (non-terminal) table. The RTN table is preferably static while the remaining two tables evolve as a Hidden Markov Model ("HMM") search proceeds. The theory of HMMs is known. Labeled grammar arcs having either a non-terminal label representing another RTN sub-network or a HMM label representing a HMM are defined in a fourth table called a lexicon. Preferably, unlabeled grammar arcs are handled specially, as they represent zero delay in the propagation of hypothesis scores through the network. That is, an unlabeled arc has no associated HMM through which the scores must propagate. Additionally, all self-referential labels or cyclic references shall be termed recursive.

In general, an initial HMM includes only a degenerate grammar consisting of a start node, an end node and a single arc with a non-terminal label. During the HMM's evolution, upon encountering this, or subsequent, non-terminal arcs, the encountered arc is replaced with a sub-network which it represents and then examined again. This process continues until all non-terminal references on the earliest arcs are eliminated. If a resulting label references an HMM, an appropriate model structure is built as indicated by the lexicon. Once all leading HMM references are built, conventional HMM score integration proceeds. As a score emerges from an HMM and needs to be propagated further in the network, additional evolution occurs. In this way, the grammar represented in both the grammar arc and null arc tables evolve into a much larger grammar. Only those regions of the grammar touched by the HMM search are expanded. Beam search methods may be implemented which limit the amount of grammar expansion. Beam searching is known, and is more fully described in "The HARPY Speech Understanding System," by B. T. Lowerre and D. R. Reddy, *Trends in Speech Recognition, chap.* 15, pp. 340–360, 1980, W. A. Lea, which is incorporated herein by reference. After a period of use, a natural finite-state approximation of the actual task language is formed.

A natural extension of the ideas underlying beam searching and HMM is a concept known as Ephemeral HMM ("EHMM"), wherein HMMs are instantiated as needed and are subsequently de-instantiated when they are no longer needed. EHMMs are preferably utilized in conjunction with the present invention.

Turning to FIG. 7, and upon entering START block 302, processing system 100 begins selectively segmenting the received data set into one or more segments utilizing a syntactic recognition algorithm, which preferably utilizes an evolutional grammar incorporating EHMMs, to thereby identify each of the data subsets among a number of alternatives. Initially, the recognition system begins with no initial grammar, i.e., no EHMMs. During the initialization procedure, block 701, an initial input probability or score is applied to the grammar start node, the only initially existing active node. The input score is preferably set to zero (a good score) and all other scores are set to a small value, e.g., −1000 (a bad score). This scoring arrangement acts as an initial condition from which the grammar evolution and data set scoring proceeds. Immediately, all EHMMs needed to represent all leading arcs in the grammar are created. Alternatively, the initial scores may be sampled, and if they are poor or below a threshold level the EHMM is not activated.

The strokes of the handwritten sample are processed in these EHMMs by processing system 100 and, in the same manner as conventional finite-state HMM processing, block 702. Stroke scores which are above a predetermined threshold value are propagated through the grammar network. As stroke scores are propagated from the EHMMs, additional successor EHMMs in the grammar network are instantiated. As the stroke scores are updated a list is preferably created of active stroke requests, block 703. Processing system 100 determines whether a given stroke score is over a predetermined threshold. If the stroke score is above the threshold, processing system 100 determines whether a stroke model for the stroke exists, decisional block 704. If the stroke model does not exist, NO branch of decisional block 704, then memory is allocated for the stroke model and the stroke model is created, block 705.

Next, EHMM scores are computed for the stroke, block 706. As the stroke scores appear from the EHMMs, additional successor EHMMs in the grammar network are instantiated. While this process continues, earlier EHMMs scores begin to decline, decisional block 707, ultimately being reduced to inconsequential levels, NO branch of decisional block 707, at which point these EHMMs vanish and the associated memory is released, block 708. Next, processing system 100 determines whether the entire handwriting sample has been processed, decisional block 709. If the handwriting sample has not been processed, NO branch of decisional block 709, then processing system 100 returns to propagate further stroke scores at block 702. If the entire handwriting sample has been processed, YES branch of decisional block 709, then processing system 100 sorts EHMM stroke scores in track-back, block 710. Trace-back is performed to identify one or more stroke sequences of the handwriting sample by chaining backwards through the EHMM branches with the highest stroke scores to the start node. Due to the localized nature of the search and known pruning methods, the amount of trace-back information stored is relatively small, this data yielding the recognition results.

Several methods for determining satisfactory score pruning levels have been used in beam searching algorithms, in particular ratios to best score and offsets from best score are the most common. A dual threshold using linear pruning functions of maximum grammar node scores is presently preferred.

$$s_{max} = \max_n s_n$$

where s is a score of node n. Then $$s_{on} = \alpha_{on} + \beta_{on} s_{max}$$

and $$s_{off} = \alpha_{off} + \beta_{off} s_{max}$$

where α and β are fixed parameters. These score constraints are used to prune lower scoring HMMs on the next input sample. Maximum grammar node scores typically, but not necessarily, increase monotonically in magnitude throughout the processing of a valid handwriting sample. Hence, for values of β less than unity, threshold constraints relax with increasing time, and for values of β greater than unity, threshold constraints tighten.

FIG. 8 illustrates the segmentation of several letter samples as a result of a training procedure. In this figure, a one-state HMM is used to model each stroke, and there are 6, 8 and 5 strokes in the letters "a", "g", and "j", respectively. The letters "a" and "g" share the first 4 strokes (s1, s4, s5, s6); the letters "g" and "j" share the last 4 strokes (s18, s19, s20, s1); stroke s1 (corresponding to upward ligature) is shared by all three samples. Each letter being composed of a number of strokes. Accordingly, a letter model is a concatenation of several stroke models. Sharing among letters is enforced by referring to the same stroke models, wherein a stroke can be any segment of a handwritten script. Preferably, the stroke models are trained first on isolated letters and then on whole word samples. The strokes are defined statistically by the HMM training procedure which is preferably composed of three levels.

The first level, letter training, is carried out on isolated letter samples. The initial parameters for this level of training are obtained through equal-length segmentation of all the letter training samples. This level of training is relatively fast because EHMMs for letters contain a small number of states and, therefore, the segmentation tends to stabilize rapidly. Although it cannot fully capture the characteristics of cursive handwriting, this level serves as a model initializer.

The model parameters obtained during the first-level of training are then passed on as initial parameters for the second level of training, linear word training, which is carried out on whole word samples. The reference "linear" is used because each word sample is bound to a single sequence of stroke models. Thus, each sample is labeled not only by the corresponding word, but also by the exact stroke sequence corresponding to the particular style of that sample. Such highly constrained HMM training is preferred to obtain reliable results as the models are not yet adequately trained. The disadvantage is that the stroke sequence corresponding to each sample has to be manually composed. Although each handwritten sample word can be uniquely decomposed into a string of letters, a letter may have more than one model, each representing a different handwriting convention or style. Different letter models may require different ligature types to follow or proceed, and delayed strokes may appear at various locations in a handwritten sample.

Lastly, there is a third-level of training, lattice word training, wherein each word is represented by a lattice, or finite state network, that includes all possible stroke sequences that can be used to model the word. The finite state network corresponding to each word is described by a sub-grammar. Each training sample is labeled only by the word, or index to the sub-grammar representing the word. The stroke sequence that best matches the sample is chosen by the system and the resulting segmentation is used for parameter re-estimation. FIG. 9 illustrates the segmentation of a sample "rectangle" after lattice word training. The solid squares indicate the boundaries between letters, including ligatures and a delayed stroke, further described below, and the stars indicate the boundaries between strokes.

Note that in English cursive script, crosses (for t's and x's) and dots (for i's and j's) tend to be delayed, and are therefore referred to as "delayed strokes". Since time sequence is important information in an online recognizer, delayed strokes need to be handled properly. Conventional approaches detect the delayed strokes in preprocessing and then either discard them or use them in postprocessing. The drawbacks to these approaches are that the information contained in delayed strokes is wasted in the first case, and inadequately used in the second case as stroke segmentation will not be influenced by the delayed stroke data. Furthermore delayed strokes are not always delayed until the end of a word, often they appear right before or after the main body of the corresponding letter or at a natural break between two letters in a word. Accordingly the preferred approach is to treat delayed strokes as special letters in the alphabet, giving a word with a delayed stroke alternative spellings to accommodate all possible sequences with delayed strokes in various positions. During recognition, therefore, delayed strokes are considered as inherent parts of the handwriting sample or other letters and contribute directly to the scoring and training thereby incorporating as much knowledge as possible into the dynamic scoring process.

Although the present invention, its principles, features and advantages have been set forth in detail through the illustrative embodiment, it should be appreciated that various modifications, substitutions and alterations can be made herein, and to the illustrative embodiment, without departing from the spirit and scope of the present invention.

What is claimed is:

1. A method for performing handwriting recognition on a received data set, said received data set comprising data points representative of a handwriting sample, said method comprising the steps of:

preprocessing said data points of said data set and generating a set of resampled data points, said resampled data points being substantially equidistantly spaced along said handwriting sample, said preprocessing step further comprising the step of preprocessing said data points of said data set to reduce signal abnormalities of said data set; said preprocessing step further including the step of filtering said data set to remove extraneous noise, wherein said filtering step further includes the steps of:

identifying cusps within said data set, said identifying cusps step further including the steps of:

constructing a focus region, said focus region including data points in the data set in sequence starting from a starting focus point to an ending focus point, said starting focus point corresponding to the first data point in the data set, said ending focus data point being at least two data points in sequence from said starting focus point;

determining linear distances to the starting focus point and the ending focus point for each said data point in the focus region;

identifying a data point in the focus region as a potential cusp point if the magnitude of either of the starting or the ending focus point linear distances exceeds the linear distance between the starting and the ending focus point;

determining, for each of the potential cusp points, the smaller of the linear distance from the potential cusp data point to the starting focus point and the linear distance from the potential cusp point to the ending focus point;

determining whether the maximum of the smaller linear distances for all the potential cusp points exceeds a threshold value; and, storing the data point corresponding to the maximum as a cusp point; and screening said extraneous noise from said data set utilizing a curve approximating technique, said curve approximating technique treating each identified cusp as a boundary point, said preprocessing step further including the step of normalizing said data set to reduce the geometric variance in said handwriting sample thereby causing said data set to lie within a prescribed range;

computing a sequence of features from said resampled data points;

comparing each feature to stochastic recognition models to obtain feature scores, said stochastic recognition models comprising a plurality of probability distributions; and propagating said feature scores in sequence through an evolutional grammar network for obtaining cumulative hypothesis scores using a stochastic recognition algorithm.

2. A method for operating a processing system to perform handwriting recognition, said method comprising the steps of:

receiving an input data signal representative of a handwriting sample including at least one symbol;

preprocessing said data points of said data set and generating a set of resampled data points, said resampled data points being substantially equidistantly spaced along said handwriting sample;

computing a sequence of features from said resampled data points;

comparing each feature to stochastic recognition models to obtain feature scores, said stochastic recognition models comprising a plurality of probability distributions; and propagating said feature scores in sequence through an evolutional grammar network for obtaining cumulative hypothesis scores using a stochastic recognition algorithm, wherein said evolutional grammar network is represented by a grammar network comprised of arcs interconnecting nodes, ones of said arcs being terminal arcs representative of respective stochastic recognition models and others of said arcs being non-terminal arcs representing respective grammar sub-networks, said nodes including a source node and a destination node to said node source such that each sequence of arcs through the network from said source node comprises a word in a predetermined vocabulary, said method further comprising the steps of:

defining a first transition network having at least one non-terminal arc;

recursively replacing a first non-terminal arc with transition networks, in response to the appearance of a hypothesis score meeting a predetermined turn-on criterion at said source node of a non-terminal arc, until all of said arcs emanating from said source node are terminal arcs; and generating in a memory location said recognition models represented by all of said arcs emanating from said source node.

3. The method of claim 2 further comprising the step of:

identifying the highest hypothesis score at said destination node for recognizing said handwriting sample.

4. The method as set forth in claim 2 wherein said recognition models represented by each of said terminal arcs of said network producing one or more recognition parameters, said method further comprising the step of ceasing to propagate a hypothesis score through an individual one of said recognition models if said parameters satisfy a predetermined turn-off criterion.

5. The method as set forth in claim 2 wherein said recognition models represented by each of said terminal arcs of said network produces at least one recognition parameter, said method further comprising the step of:

ceasing to propagate a hypothesis score through an individual one of said recognition models if cumulative hypothesis scores within said individual model fall below a predetermined turn-off threshold after having exceeded it.

6. A method for operating a processing system to perform handwriting recognition, said method comprising the steps of:

receiving an input data signal representative of a handwriting sample including at least one symbol;

preprocessing said data points of said data set and generating a set of resampled data points, said resampled data points being substantially equidistantly spaced along said handwriting sample;

computing a sequence of features from said resampled data points;

comparing each feature to stochastic recognition models to obtain feature scores, said stochastic recognition models comprising a plurality of probability distributions; and propagating said feature scores in sequence through an evolutional grammar network for obtaining cumulative hypothesis scores using a stochastic recognition algorithm, wherein said evolutional grammar network is initially null, said method further including the steps of:

designating, upon a determination that said evolutional grammar is null, an initial cumulative hypothesis score to a grammar start state;

dynamically creating storke representations from the grammar start state for each of said strokes;

maintaining a score for each of said stroke representations created;

propagating segment scores meeting a threshold level; and updating said segment scores to maintain only active stroke representations having segment scores above said threshold level.

7. The method as set forth in claim 6 further including the steps of:

chaining segment scores together which exceed said threshold level; and determining said chain of segment scores which represents said symbols of said handwriting sample.

8. A processing system for performing handwriting analysis, said processing system comprising:

an input port operable to receive a data set representative of a handwriting sample, said handwriting sample comprising one or more symbols;

a memory storage device operable to store a plurality of processing system instructions;

a processing unit for analyzing said data set by retrieving and executing at least one of said processing unit instructions from said memory storage device, said processing unit operable to:

preprocess said data points of said data set and generate a set of resampled data points, said resampled data points being substantially equidistantly spaced along said handwriting sample;

compute a sequence of features from said resampled data points;

compare each feature to stochastic recognition models to obtain feature scores, said stochastic recognition models comprising a plurality of probability distributions; and propagate said feature scores in sequence through an evolutional grammar network for obtaining cumulative hypothesis scores using a stochastic recognition algorithm, wherein said evolutional grammar network is initially null, and said processing unit is further operable to designate an initial segment score to a grammar start state;

said processing unit further operable to:
  dynamically create stroke representations from said grammar start state for each of said strokes;
  maintain a score for each of said stroke representations created;
  propagate stroke scores meeting a threshold level; and
  update said stroke scores to maintain only active stroke representations having stroke scores above said threshold level.

9. The processing system as set forth in claim 8 wherein said processing unit concatenates said recognized data subsets together by chaining stroke scores together which exceed said threshold level, and determining said chain of stroke scores which represents said symbols of said handwriting sample.

10. The processing system as set forth in claim 8 wherein said processing unit is further operable to selectively chain from through one or more of said stroke representations to said grammar start state as a function of said stroke scores.

11. The processing system as set forth in claim 8 wherein said stroke scores include stroke models having substantially undefined boundaries.

* * * * *